Patented Oct. 13, 1953

2,655,509

UNITED STATES PATENT OFFICE 2,655,509

1-p-CHLOROPHENYL-2-PHENYL-4-(N-PYRROLIDINO)-BUTENES

Jack Mills, Indianapolis, Ind., assignor to Eli Lilly and Company, Indianapolis, Ind., a corporation of Indiana No Drawing. Application April 14, 1951,
Serial No. 221,135

6 Claims. (Cl. 260—313)

This invention relates to novel organic compounds useful as therapeutic agents.

In recent years there have been discovered compounds which when administered to humans provide symptomatic relief from many allergic conditions. Such compounds are known generally as antihistaminic compounds because they prevent or reduce certain of the symptoms or pharmacological effects commonly produced by histamine. A desideratum in the treatment with antihistaminic compounds is the attainment of a prolonged effect with a minimal size of dose. Compounds of such character heretofore employed for alleviation of allergies are usually administered in dosages of from 50 to 100 mg. and those relatively large doses provided relief from allergic symptoms for periods of time averaging only three or four hours. Accordingly, for 'round-the-clock relief, treatment with the compounds in general use today requires a multiplicity of treatments and the ingestion of substantial quantities of medicament.

By this invention there are provided antihistaminic compounds of sufficiently high potency so that administration thereof in doses ranging from 10 to 25 mg. produces effective relief from allergic symptoms. Moreover, the novel compounds of this invention have a surprisingly long duration of action, providing an effective relief averaging about 12 hours.

The compounds of this invention comprise a 1-p-chlorophenyl-2-phenyl-4-(N-pyrrolidino)-butene and acid addition salts thereof. The chemical structures of the novel compounds are not definitely established, and hence, it is not possible at present to define the compounds exactly by means of chemical nomenclature or chemical formulas. However, the compounds of this invention are readily characterizable and identifiable by their physical properties such as melting points, infrared absorption spectra, pk. a' values and the like, and those properties will be employed herein for identification purposes.

The 1-p-chlorophenyl-2-phenyl-4-(N-pyrrolidino)-butene is produced by a process which includes the dehydration of 1-p-chlorophenyl-2-phenyl-4-(N-pyrrolidino)-butanol-2 represented by the following formula

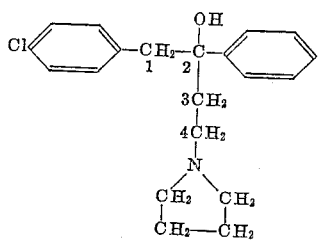

Dehydration, i. e., removal of the elements of water, from the above represented butanol compound may result in the formation of a 1-2 or a 2-3 butene compound depending upon whether a hydrogen atom is removed from the 1 or 3 carbon atoms, and whether the double bond so formed undergoes rearrangement, and it is with respect to the location of the double bond that uncertainties of structure exist.

The dehydration is effected by an acidic dehydrating agent, for example, hydrochloric acid, hydrobromic acid, phosphorous tribromide, phosphorous oxychloride, and the like. Because of the acidic nature of the dehydrating agent, the 1-p-chlorophenyl-2-phenyl-4-(N-pyrrolidino)-butene is recovered in the form of an acid addition salt. The salt can be converted into the free butene base by treatment with an alkali in accordance with customary practices.

The substituted butanol whose formula is given above and which is an intermediate in the synthesis of the novel butene compounds, is obtained by reacting acetophenone, pyrrolidine and formaldehyde in accordance with the Mannich procedure, and treating the ω-(N-pyrrolidino)-propiophenone which is produced with a p-chlorobenzyl magnesium halide thereby obtaining the 1-p-chlorophenyl-2-phenyl-4-(N-pyrrolidino)-butanol-2.

The 1-p-chlorophenyl-2-phenyl-4-(N-pyrrolidino)-butene is a low-melting solid which can be distilled in vacuo, without decomposition. It is soluble in the common organic solvents but is substantially insoluble in water. The acid addition salts of the butene compound are in general crystalline compounds, and have solubility characteristics which vary in accordance with the particular acid employed in their preparation.

Numerous salts of the 1-p-chlorophenyl-2-phenyl-4-(N-pyrrolidino)-butene are readily prepared by methods known to the art, as, for example, by the reaction of stoichiometrically equivalent amounts of the base and the selected acid in a mutual solvent, followed by removal of the solvent by evaporation or the like, whereby the desired acid addition salt is recovered as the residue. Illustrative acid addition salts of the butene compound within the scope of this invention include the nontoxic, pharmaceutically useful acid addition salts. The term "nontoxic, pharmaceutically useful acid addition salts" designates those salts which do not materially increase the toxicity of the basic dehydration product, and which because of solubility and/or other characteristics are especially suitable for incorporation into pharmaceutical preparations for therapeutic use. Examples of such acid addition salts are salts formed with mineral acids, such as hydrochloric, hydrobromic, nitric, sulfuric and phosphoric acids, which salts exhibit water solubility in greater or lesser degree. Additional examples of salts are those prepared from organic acids, such as acetic, maleic, citric, cinnamic, stearic, and oleic acids and the like. The salts prepared from organic acids having a relatively great number of carbon atoms, for example, oleic acid, are characterized by slight water solubility and appreciable solubility in oils.

The following examples specifically illustrate the preparation of certain of the compounds of this invention.

Example 1

A mixture of 1800 ml. of absolute ethanol, 427 g. (6 mols) of pyrrolidine, and a trace of methyl orange is cooled in an ice bath and gaseous hydrogen chloride is bubbled through the mixture until a red color develops, indicating that all of the amine has been converted to the hydrochloride. The addition of hydrogen chloride is stopped, the ice bath is removed and to the solution are added 720 g. of acetophenone, 270 g. of paraformaldehyde and 10 ml. of concentrated hydrochloric acid. The mixture is stirred and refluxed vigorously for one hour. An additional 180 g. of paraformaldehyde are then added, and refluxing is continued for about three hours. The hot solution is poured into 6 liters of acetone and the mixture is chilled overnight. A precipitate of ω-(N-pyrrolidino)-propiophenone hydrochloride separates. The precipitate is filtered off, washed with cold acetone, and dried in air.

ω-(N-pyrrolidino)-propiophenone hydrochloride thus prepared melted at about 163–164° C. after recrystallization from acetone. Analysis: Calculated for $C_{13}H_{18}NOCl$: N, 5.85 percent. Found: N, 5.85 percent.

To a suspension of 4 mols of ω-(N-pyrrolidino)-propiophenone hydrochloride in 1500 ml. of water and 100 g. of ice in a separatory funnel are added a 50 percent aqueous solution containing 200 g. of sodium hydroxide, and 2 l. of ether. The mixture is shaken vigorously until all of the suspended matter dissolves. The ether is then removed, washed with 1 l. of water and dried over anhydrous magnesium sulfate. The anhydrous ether solution of ω-(N-pyrrolidino)-propiophenone thus prepared is added to a Grignard reagent prepared from 6 mols of p-chlorobenzyl chloride and 6 mols of magnesium turnings in 3,000 ml. of anhydrous ether. The ethereal solution of the ketone is added to the Grignard reagent at such a rate that rapid refluxing is maintained. After all of the ketone has been added, the reaction mixture is stirred for 2 hours and is decomposed by pouring it over a mixture of 500 g. of ice and 6 mols of concentrated hydrochloric acid. The hydrochloric acid addition salt of 1-p-chlorophenyl - 2 - phenyl - 4 - N - (pyrrolidino) - butanol-2 formed in the reaction separates at the ether-water interface as a white crystalline material. The aqueous phase is removed and discarded, and the mixture of ether and hydrochloride salt is converted to 1-p-chlorophenyl-2 - phenyl - 4 - (N - pyrrolidino) - butanol-2 by treatment with 10 percent sodium hydroxide solution. The base is removed by extraction with ether, and the ether extracts are dried over magnesium sulfate.

1 - p - chlorophenyl - 2 - phenyl - 4 - (N - pyrrolidino)-butanol-2 melted at about 109–110° C. after recrystallization from petroleum ether.

For characterization, 1 - p - chlorophenyl - 2-phenyl - 4 - (N - pyrrolidino) - butanol - 2 hydrochloride was formed by saturating an ether solution of the free base with anhydrous hydrogen chloride and filtering off the precipitate of the hydrochloric acid addition salt which formed. 1 - p - chlorophenyl - 2 - phenyl - 4-(N-pyrrolidino)-butanol-2 hydrochloride melted at about 185–187° C. Analysis: Calculated for $C_{20}H_{25}N_2OCl_2$: N, 3.83 percent. Found: N, 3.81 percent.

A solution of 200 g. of 1-p-chlorophenyl-2-phenyl - 4 - (N - pyrrolidino) - butanol - 2 in 750 ml. of concentrated hydrochloric acid is refluxed for 9 hours thereby causing a dehydration of the butanol compound, and the formation of the hydrochloric acid addition salt of a 1-p - chlorophenyl - 2 - phenyl - 4 - (N - pyrrolidino) - butene. The hydrochloride salt formed crystallizes in the oily lower layer of the two phase reaction mixture and is removed therefrom by filtration. The filtrate is again refluxed for 9 hours, cooled to 0° C., and a second crop of the hydrochloric acid addition salt of the dehydration product is obtained and filtered off. The filtrate containing residual amounts of 1-p-chlorophenyl - 2 - phenyl - 4 - (N - pyrrolidino) - butanol-2 is again refluxed for 9 hours to yield an additional crop of the salt of the dehydration product. The several fractions of the butene compound are combined and triturated with several small portions of hot acetone, and recrystallized from alcohol-ether mixture. The hydrochloric acid addition salt of the dehydration product, 1 - p - chlorophenyl - 2 - phenyl - 4-(N-pyrrolidino)-butene hydrochloride, melts at about 227–228° C. Analysis: Calculated for $C_{20}H_{23}NCl_2$: N, 4.03 percent; Cl, 20.18 percent. Found: N, 4.12 percent; Cl, 20.27 percent.

The titration curve of the hydrochloride of the 1 - p - chlorophenyl - 2 - phenyl - 4 - (N - pyrrolidino)-butene through a range of pH 2.90 and pH 10.50 disclosed the presence of a single titratable group with pk. $a$ 8.1±0.1.

The infrared absorption curve of the hydrochloride salt of the dehydration product, suspended in mineral oil, displayed absorption maxima at the following wavelengths expressed in microns: 3.88, 4.02, 6.08, 6.73, 7.03, 7.15, 7.80, 8.31, 8.45, 9.07, 9.24, 9.43, 9.63, 9.91, 10.00, 10.12, 10.88, 11.92, 12.30, 12.98, 13.48, 14.03, 14.37 and 14.68.

Example 2

50 g. of the hydrochloride of the 1-p-chlorophenyl - 2 - phenyl - 4 - (N - pyrrolidino) - butene were suspended in 500 ml. of water and the solution was made alkaline with 5 percent aqueous sodium hydroxide solution. The free base of the butene compound was extracted from the alkaline mixture with three successive extractions with 200 ml. portions of ether. The combined ether extracts were dried over anhydrous magnesium sulfate and the ether was evaporated in vacuo. The resulting oily residue was distilled in vacuo. The 1 - p - chlorophenyl-2 - phenyl - 4 - (N - pyrrolidino) - butene boiled at 190–195° C. at a pressure of 0.3 mm. of mercury The distillate was a clear, oily liquid which on standing slowly crystallized. The crystals melted at about 48–49° C. Analysis: Calculated for $C_{20}H_{22}NCl$: C, 77.0 percent; H, 7.11 percent; N, 4.49 percent; Cl, 11.36 percent. Found: C, 77.2 percent; H, 7.40 percent; N, 4.54 percent; Cl, 11.25 percent.

The infrared absorption curve of the base of the dehydration product suspended in mineral oil displayed absorption maxima at the following wavelengths expressed in microns: 3.32, 3.39, 3.58, 6.28, 6.70, 6.92, 7.12, 7.30, 7.44, 7.61, 7.78, 8.76, 9.16, 9.68, 9.84, 9.97, 10.05, 12.38, 13.01, 13.23, and 14.25. The density of the base was about 1.1052 at 25.5° C.

The ultraviolet absorption curve of a solution of the base in 95 percent ethanol was found to have the following maxima, and absorption values:

max$_1$ 360 m$\mu$; a 112; conc. 0.538 mg./ml.
max$_2$ 243 m$\mu$; a 9500; conc. 0.00538 mg./ml.

Example 3

To a solution of 31.15 g. (0.1 mol) of the 1-p-chlorophenyl - 2 - phenyl - 4 - (N-pyrrolidino)-butene in 100 ml. of absolute ethanol were added 20 g. (2 mol) of syrupy phosphoric acid. The mixture was stirred well and thereafter evaporated to dryness. The residue, consisting of the phosphate salt of the butene compound was recrystallized from alcohol-ether mixture. The recrystallized 1 - p - chlorophenyl - 2 -phenyl- 4-(N-pyrrolidino)-butene phosphate melted at about 128–129° C.

Example 4

3.12 g. (0.01 mol) of the 1-p-chlorophenyl-2-phenyl-4-(N-pyrrolidino)-butene were dissolved in 200 ml. of anhydrous ether, and anhydrous hydrogen bromide was passed into the solution until 0.82 g. (0.01 mol) had been absorbed. The ether was evaporated in vacuo and the residue, consisting of the hydrobromide salt of 1-p-chlorophenyl - 2 - phenyl - 4 - (N - pyrrolidino)-butene was recrystallized from alcohol-ether mixture. The recrystallized hydrobromide salt melted at about 228–229° C. Analysis: Calculated for $C_{20}H_{23}NClBr$: N, 3.56 percent; total halogen 4.122 mg. for a sample weighing 4.889 mg.

Found: N, 3.54 percent; total halogen, 4.147 mg.

I claim:

1. A compound of the group consisting of a 1-p-chlorophenyl - 2 - phenyl - 4 - (N - pyrrolidino)-butene characterized by a boiling point of about 190–195° C. at a pressure of about 0.3 mm. of mercury, a melting point of about 48–49° C., and infrared absorption maxima expressed in microns at 3.32, 3.39, 3.58, 6.28, 6.70, 6.92, 7.12, 7.30, 7.44, 7.61, 7.78, 8.76, 9.16, 9.68, 9.84, 9.97, 10.05, 12.38, 13.01, 13.23 and 14.25; and nontoxic, pharmaceutically useful acid addition salts thereof.

2. A 1 - p - chlorophenyl - 2 - phenyl - 4 - (N-pyrrolidino)-butene characterized by the properties as set forth in claim 1.

3. An acid addition salt of a 1-p-chlorophenyl-2 - phenyl - 4 - (N - pyrrolidino) - butene characterized by the properties as set forth in claim 1.

4. The hydrochloride salt of a 1-p-chlorophenyl - 2 - phenyl - 4 - (N - pyrrolidino)-butene characterized by the properties as set forth in claim 1.

5. A hydrobromide salt of a 1-p-chlorophenyl-2 - phenyl - 4 - (N - pyrrolidino) - butene characterized by the properties as set forth in claim 1.

6. The phosphate salt of a 1-p-chlorophenyl-2 - phenyl - 4 - (N - pyrrolidino) - butene characterized by the properties as set forth in claim 1.

JACK MILLS.

References Cited in the file of this patent

FOREIGN PATENTS

| Number | Country | Date |
|---|---|---|
| 627,139 | Great Britain | July 29, 1949 |
| 265,665 | Switzerland | Apr. 1, 1950 |